Dec. 17, 1957     O. R. FIELD     2,816,585
AUTOMATIC SAWMILL CARRIAGE UNLOADER
Filed Oct. 26, 1954     2 Sheets-Sheet 1
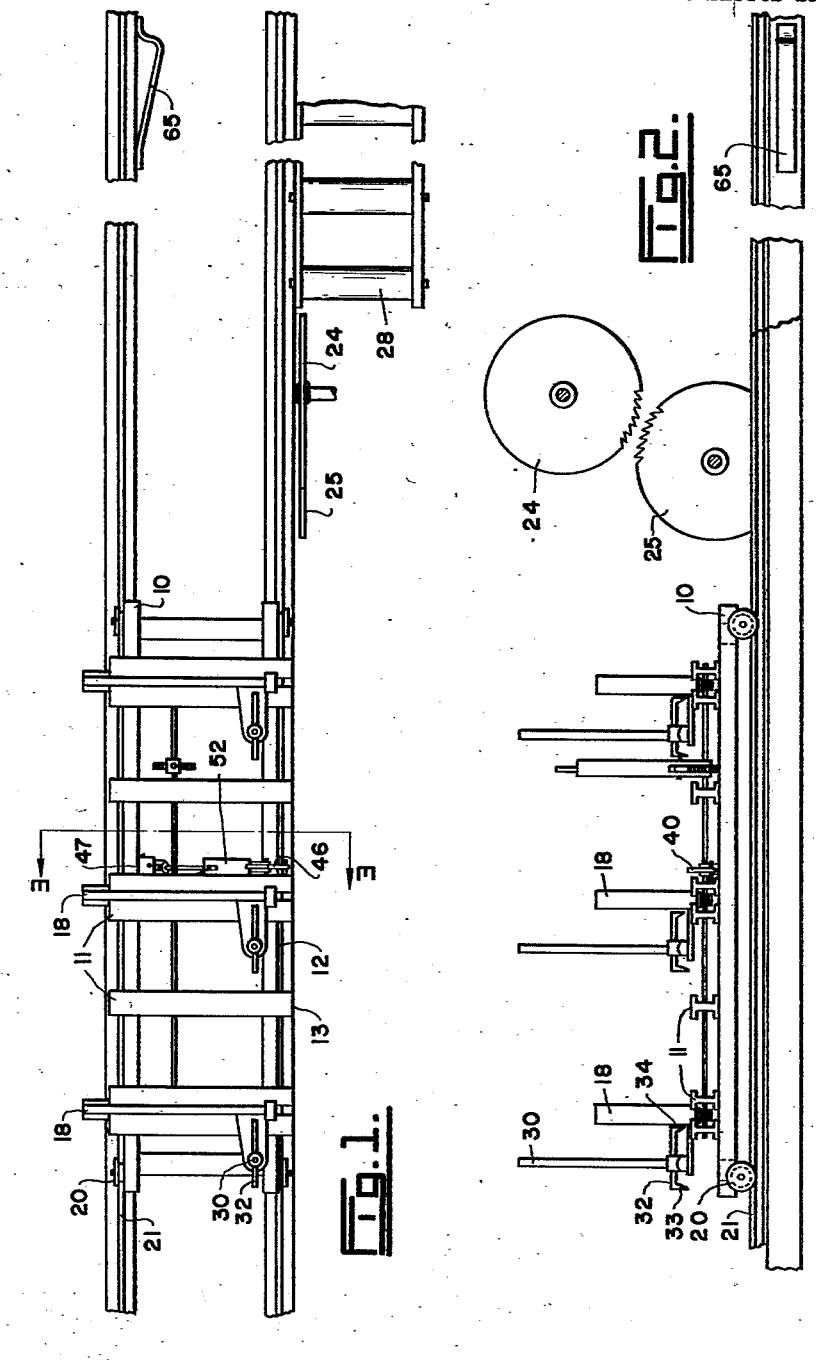
INVENTOR
OSWEL ROY FIELD
BY
Fetherstonhaugh & Co.
ATTORNEYS Dec. 17, 1957     O. R. FIELD     2,816,585
AUTOMATIC SAWMILL CARRIAGE UNLOADER
Filed Oct. 26, 1954     2 Sheets-Sheet 2
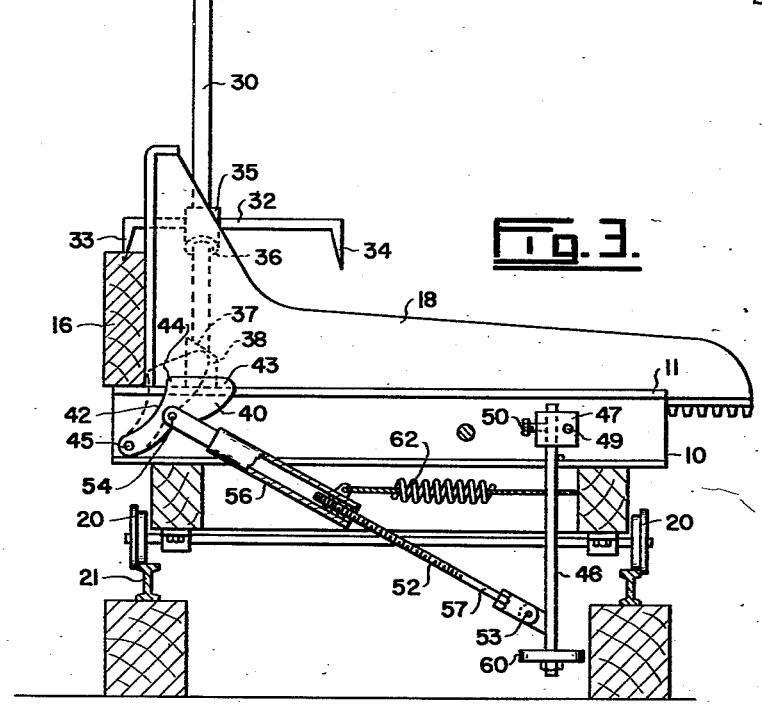
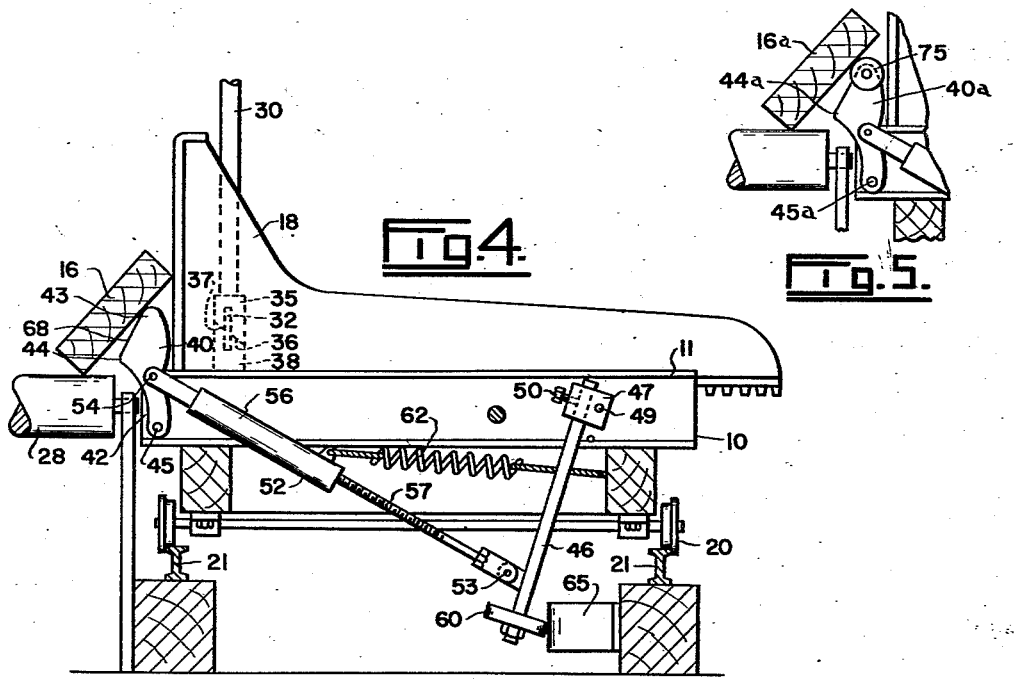
INVENTOR
OSWEL ROY FIELD
BY
Fetherstonhaugh & Co.
ATTORNEYS

United States Patent Office 2,816,585
Patented Dec. 17, 1957

2,816,585

AUTOMATIC SAWMILL CARRIAGE UNLOADER

Oswel Roy Field, Courtenay Township, British Columbia, Canada

Application October 26, 1954, Serial No. 464,777

2 Claims. (Cl. 143—157)

This invention relates to apparatus for automatically unloading timbers from sawmill carriages.

The main object of this invention is the provision of a very simple unloader which may be applied to any sawmill carriage without altering the construction of the latter. This unloader is particularly designed for carriages of simple construction and which do not include any elaborate controls.

Sawmill carriages have means for holding timber thereon and extending along a side thereof. The timber projects beyond this side. The carriage is reciprocated past head saws which may be two circular saws in a common vertical plane, or a bandsaw. Each time the carriage moves in one direction past the saws, a slice is cut off the timer and usually falls on to a suitable conveyor. The term "timber" throughout this specification and in the appended claims is intended to include logs and boards. Any desired number of boards may be cut off a timber before the latter is turned so that one or more boards may be cut off another side thereof. The carriages normally include means for moving the timber outwardly of the carriage after each cut.

The timbers are usually held in place by one or more dogs having points or spikes driven down into the top thereof. With ordinary inexpensive carriages, there usually is some difficulty in freeing the timber from the dogs when the cutting operation is over or when it is desired to turn the timber so that boards or planks may be cut from another side of it. There may be two or three dogs in the top of the timber, and the carriage has to be stopped while a man works each dog free of the timber and then moves the latter off the carriage.

The present invention remedies this defect in a very simple and effective manner. The carriage has a supporting table along one side thereof. This table is usually in the form of a plurality of spaced beams extending across the carriage. One or more dogs, and there are usually several of these, are positioned to engage the top of a timber extending along the table at a side of the carriage. The carriage may have the usual one or more knees for sliding the timber outwardly of the carriage after each cut, in which case the dogs move with them. An ejector arm is movably mounted near the table. This arm is so designed that when it is moved by suitable means, it engages the bottom of the timber and kicks it off the table. By engaging the bottom of the timber in this manner, it is not necessary to have someone clear the dog or dogs from the timber before it can be ejected.

Although the ejector arm may be operated manually, it requires considerable force to move the timber in this manner, and it is desirable that it be moved automatically. For this purpose, a lever pivotally mounted on and depending from the carriage inwardly of the ejector arm is connected to the latter by a stiff link. In co-operation with this, a cam member is mounted in the path of movement of the carriage to engage the lower end of the lever and thereby swing said end inwardly when the carriage is moved past said member. The cam member may be positioned a little beyond the course of the carriage when it is being reciprocated during the normal cutting action so that in order to eject the timber, it is only necessary to run the carriage a little beyond this normal course.

An example of this invention is illustrated in the accompanying drawings, in which, Figure 1 is a plan view of a carriage incorporating this invention, Figure 2 is an elevation of the side of the carriage on which a timber would rest, Figure 3 is a cross section taken on line 3—3 of Figure 1 with a timber on the carriage, and showing the ejector arm in its normal non-operative position, Figure 4 is a cross section similar to Figure 3, but with the carriage moved to a position where the ejector arm is moving a timber off it, and Figure 5 is a fragmentary view illustrating an alternative form of the invention.

Referring to the drawings, 10 is a sawmill carriage having a supporting table extending transversely thereof in the form of a plurality of spaced beams 11, said beams projecting beyond the side 12 of the carriage, as indicated at 13. A timber 16 rests on this table and extends along the side 12 of the carriage and projects a little beyond the ends 13 of the beams. A plurality of knees 18 are movably mounted on the top of the carriage and bear against the innermost surface of the timber. These knees are moved by a suitable mechanism, not shown, to shift the timber outwardly of the carriage. As any desired mechanism may be employed for this purpose, and this mechanism is well known in the trade, it is not illustrated or described herein.

The carriage is supported by a plurality of wheels 20 rotating on tracks 21, said tracks extending by a head saw which, in this example, is made up of upper and lower circular saws 24 and 25 mounted in a common vertical plane and rotated by a suitable source of power, not shown. These saws are so positioned that when the carriage moves past them, a portion of the timber projecting beyond the side of the table is cut off therefrom. The cut off portion or board may be received by a suitable conveyor 28 aligned with the saws. The carriage is reciprocated past the saws by any well-known mechanism for this purpose.

One or more posts 30 are mounted on and project upwardly from the carriage 10. In this example, there is a post 30 secured to each knee 18 near the end thereof which engages the timber. A substantially horizontal dog 32 having downwardly-projecting prongs or spikes 33 and 34 on its opposite ends is slidably mounted on each post 30. One end of each dog is longer than the other, as shown in Figures 2 and 3, in order to accommodate timbers of different sizes. Each dog may be provided with a sleeve 35 slidable on the post and having a bevelled lower end 36 which co-operates with a correspondingly-bevelled upper end 37 of a tube 38 surrounding the lower end of said post. When a dog drops down on to the tube therebeneath the bevelled ends of said tube and the dog sleeve swing the dog into a position extending longitudinally of the carriage, see Figure 2, where it is out of the way of the next log to be delivered on to the carriage table.

When a timber 16 is placed on the table beams 11 and extends longitudinally of the carriage, the dogs 32 are pressed downwardly until the spikes thereof bite into the timber near its inner edge, see Figure 3, to hold it against the ends of the knees 18. The knees are moved until a desired portion of the timber projects beyond the side of the table, said side being the ends 13 of the beams. When the carriage is moved past the head saws 24 and 25, a portion of the timber is cut off and drops on to the conveyor 28. After the carriage has been moved back past the saws, the knees are advanced to project another portion of the timber beyond the table side.

An ejector arm 40 is movably mounted near the edge of the supporting table upon which the timbers normally rest. This arm is preferably formed with substantially vertical and horizontal portions 42 and 43 joined together to form a heel 44 at the upper end of the vertical portion. The lower end of the vertical portion 42 of the arm is pivotally mounted by a pin 45 beneath the upper surface of the table or the beams 11. In this example, the pin projects outwardly from a side of one of these beams. The pin 45 is so located relative to the upper surface of the beam that the heel 44 lies near the upper surface of said beam when the ejector arm is in an inclined position, as shown in Figure 3. The length of the portion 42 of the arm is such that when the latter is swung outwardly of the carriage, the heel 44 projects above the top of the table, as shown in Figure 3 in dotted lines. Thus, the arm engages the bottom part only of the timber 16 during this movement.

The ejector arm may be swung back and forth in any desired manner, but as considerable force is required in order to kick a timber outwardly off the carriage table, it is preferable to use the weight of the carriage to assist this action.

In the preferred form of the invention, a lever 46 is slidably mounted in a block 47 which is pivotally mounted at 49 on the same beam 11 of the carriage as the ejector arm, said lever extending downwardly from the carriage. A set screw 50 adjustably retains the lever in the block. A stiff link 52 is connected at one end at 53 to the lever near the lower end thereof, and at its opposite end at 54 to the arm above the pivot 45 thereof. This link is preferably made in two telescoping parts 56 and 57 in order that it may be adjusted to fit carriages of different sizes. The lever extends substantially straight down near and inside one of the tracks 21 when the ejector arm is in its inclined or inoperative position, as shown in Figure 3. It is preferable to provide a wheel 60 on the lower end of the lever, the axis of said wheel being in a substantially vertical plane. Suitable means is provided for retaining the arm in its neutral position, such as, for example, a spring 62 connected at one end to the link 52 near the arm and at its opposite end to a portion of the carriage 10.

In order to shift the lower end of lever 46 back and forth, a cam member 65 is mounted in the path of movement of the carriage on the side thereof remote from the head saws and spaced from the latter a little beyond the ordinary course the carriage follows during a sawing operation. This member is located in the same plane as the wheel 60 so that when the carriage is moved outwardly from the saws sufficiently, the wheel engages said cam member and the latter causes the lever 46 to swing inwardly of the carriage. This action, through link 52, causes the upper end of the ejector arm 40 to swing outwardly relative to the opposite side of the carriage.

Figure 3 shows a dog 32 with its spike 33 driven into the top of the timber 16. When the cam member 65 starts to move the lever 46 inwardly, the heel 44 of the ejector arm engages the bottom of the timber, as shown in dotted lines in Figure 3. Further movement of the ejector arm forces the bottom of the timber outwardly causing the top thereof to drop downwardly away from the dog spike. During further movement of the ejector arm, the side 68 of the portion 40 of said arm bears against the tilted side of the timber, see Figure 4, and moves the latter off the carriage table and on to the conveyor 28. Thus it will be seen, that the first action of the ejector arm is to move the bottom of the timber outwardly, causing the top to drop downwardly from the dog and on to the side 68 of the arm, and during the second action, the timber is shifted laterally off the carriage. The full weight of the carriage and its load is available to force the bottom of the timber outwardly.

Figure 5 illustrates an alternative form of ejector arm 40a. This arm is shaped and mounted in the same way as arm 40 described above. However, arm 40a has a bearing roller 75 at its outer end, said end being the one opposite the end pivotally mounted on pin 45a. This arm is formed with a heel 44a.

Ejector arm 40a of Figure 5 functions in practically the same manner as arm 40 of Figures 3 and 4. However, when the heel 44a kicks the lower edge of a plank 16a outwardly, the upper part of this plank drops down on to roller 75 and as there is very little friction at this point, the plank tends to slide off the ejector arm on to the conveyor or table positioned to receive it. Thus, the action may be a little faster than with the ejector arm 40. In addition to this, it may not be necessary to move arm 40a as far in order to obtain results as with arm 40.

While only one ejector arm has been illustrated and described, it is to be understood that any number of these may be employed, in which case all the lever arms 46 would be connected together and only one provided with a wheel 60. With this arrangement, all the ejector arms would be swung outwardly together under the influence of the cam member 65.

While the individual parts of the unloader have been described as being mounted on different parts of the carriage, it is to be understood that they may be mounted on a separate frame to form a single unit to be mounted on any carriage.

What I claim as my invention is:

1. In a sawmill carriage, means for supporting a timber extending along a side of the carriage with a portion extending beyond said side, a dog positioned to engage the top of the timber, an ejector arm pivotally mounted beneath the supporting means, a lever pivotally mounted on and depending from the carriage near the opposite side from the ejector arm, a stiff link connected at one end to the lever near the lower end of the latter and at the opposite end to the arm above the pivot thereof, and a cam member mounted in the path of movement of the carriage to engage the lower end of the lever thereof to swing said end in the direction of the ejector arm, said lever swinging the arm upwardly by the link to engage the bottom of the timber and kick it off the supporting means when the lower end of the lever is swung in the direction of the arm.

2. In a sawmill carriage, means for supporting a timber extending along a side of the carriage with a portion extending beyond said side, a dog positioned to engage the top of the timber, an ejector arm pivotally mounted beneath the supporting means, a lever pivotally mounted on and depending from the carriage near the opposite side from the ejector arm, a stiff link connected at one end to the lever near the lower end of the latter and at the opposite end to the arm above the pivot thereof, a wheel on the lower end of the lever, the axis of said wheel being in a substantially vertical plane, and a cam member mounted in the path of movement of the carriage in the plane of the lever wheel to engage said wheel and swing the lower end of the lever in the direction of the ejector arm, said lever swinging the arm upwardly by the link to engage the bottom of the timber and kick it off the supporting means when the lower end of the lever is swung in the direction of the arm.

References Cited in the file of this patent

UNITED STATES PATENTS

| 333,664 | Peck | Jan. 5, 1886 |
| 561,396 | Hicks | June 2, 1896 |
| 581,531 | Bodin | Apr. 27, 1897 |
| 640,458 | Farr | Jan. 2, 1900 |
| 685,560 | Berry | Oct. 29, 1901 |
| 752,440 | Davies | Feb. 16, 1904 |